United States Patent [19]

Deppert et al.

[11] Patent Number: 5,330,393
[45] Date of Patent: Jul. 19, 1994

[54] GEAR UNIT FOR COMBINATION WITH AN AUXILIARY POWER CONSUMING UNIT OF A MOTOR-VEHICLE

[75] Inventors: Reinhard Deppert, Gochsheim; Manfred Lutz, Schweinfurt; Walter Kurz, Durach; Wolfgang Baier, Obbach, all of Fed. Rep. of Germany

[73] Assignee: Fichtel & Sachs AG, Schweinfurt, Fed. Rep. of Germany

[21] Appl. No.: 893,644

[22] Filed: Jun. 5, 1992

Related U.S. Application Data

[63] Continuation-in-part of Ser. No. 893,924, Jun. 4, 1992.

[30] Foreign Application Priority Data

Jun. 7, 1991 [DE] Fed. Rep. of Germany ....... 4118853

[51] Int. Cl.$^5$ .................................. F16H 3/44
[52] U.S. Cl. .................................... 475/154
[58] Field of Search ............... 475/151, 153, 154, 156, 475/159, 256, 293, 297, 312

[56] References Cited

U.S. PATENT DOCUMENTS

| 2,327,769 | 8/1943 | Claytor | 74/290 |
|---|---|---|---|
| 2,375,785 | 5/1945 | Goode et al. | 475/153 |
| 2,620,899 | 12/1952 | Swift | 475/154 X |
| 2,901,924 | 9/1959 | Banker | 475/114 |
| 2,943,517 | 7/1960 | Markley et al. | 475/159 |
| 3,082,647 | 3/1963 | Banker | 475/159 X |
| 3,469,473 | 9/1969 | Förster et al. | 475/154 X |
| 4,265,135 | 5/1981 | Smirl | 74/336 B |
| 4,644,824 | 2/1987 | Shimizu | 74/781 R |
| 4,674,612 | 6/1987 | Ogura | 475/256 X |
| 4,738,163 | 4/1988 | Anderson et al. | 475/154 X |

FOREIGN PATENT DOCUMENTS

| 0123580 | 10/1984 | European Pat. Off. | 475/153 |
|---|---|---|---|
| 2801812 | 7/1979 | Fed. Rep. of Germany . | |
| 3523999 | 2/1980 | Fed. Rep. of Germany . | |
| 2951742 | 7/1981 | Fed. Rep. of Germany . | |
| 3103397 | 8/1982 | Fed. Rep. of Germany . | |
| 3510549 | 10/1985 | Fed. Rep. of Germany . | |
| 3508808 | 3/1989 | Fed. Rep. of Germany . | |
| 3819986 | 12/1989 | Fed. Rep. of Germany . | |
| 4036209 | 5/1992 | Fed. Rep. of Germany . | |
| 2414626 | 8/1979 | France . | |
| 2628810 | 9/1989 | France . | |
| 56-86260 | 7/1981 | Japan | 475/157 |
| 2012890 | 8/1979 | United Kingdom . | |
| 2156016 | 10/1985 | United Kingdom . | |

*Primary Examiner*—Dirk Wright
*Attorney, Agent, or Firm*—Brumbaugh, Graves, Donohue & Raymond

[57] ABSTRACT

According to an illustrative embodiment of the invention, a planetary gear box is combined with an electric generator of a motor-vehicle. The planetary gear box comprises a free wheel and a gear change clutch. Such, the transmission ratio of the planetary gear box is changeable. The components of the gear box are arranged at least partially in axially overlapping relationship so that a small overall axial dimension is obtained.

51 Claims, 2 Drawing Sheets

GEAR UNIT FOR COMBINATION WITH AN AUXILIARY POWER CONSUMING UNIT OF A MOTOR-VEHICLE

This application is a continuation-in-part of application Ser. No. 07/893,924, filed on Jun. 4, 1992 now abandoned.

BACKGROUND OF THE INVENTION

This invention refers to a gear unit for combination with an auxiliary power consuming unit of a motor-vehicle. An example of such an auxiliary power consuming unit is an electric power generator which is to be driven from the internal combustion engine of a motor-vehicle. Another example of an auxiliary power consuming unit is an air compressor or an oil pump. Such auxiliary power consuming units should be driven with a substantially constant r.p.m., in order to be most effective.

Internal combustion engines of motor-vehicles have highly varying r.p.m. in operation. This means that an auxiliary power consuming unit driven by the internal combustion engine receives highly varying input r.p.m. from the internal combustion engine.

It is, therefore, desirable to equalize the r.p.m. of the auxiliary power consuming units in spite of the varying r.p.m. of the internal combustion engine driving the respective auxiliary power consuming unit.

STATEMENT OF THE PRIOR ART

From German Patent Publication 35 23 999 a gear unit is known in combination with an electric power generator. This gear unit comprises a planetary gear drive in combination with a free wheel and an electro-magnetic clutch. The input shaft of the gear unit is provided with a belt pulley driven through a belt from the internal combustion engine. In this known gear unit, the belt pulley drives a planetary wheel carrier. The sun wheel is connected with the input shaft of the generator. A free wheel unit is provided between the ring wheel and the sun wheel. The ring wheel can be prevented from rotation or released for rotation by the electro-magnetic clutch. When the ring wheel is prevented from rotation, the sun wheel is driven with an increased r.p.m. as compared with the r.p.m. of the belt pulley, while the free wheel allows relative rotation of the sun wheel and the ring wheel. When the electro-magnetic clutch releases the ring wheel for rotation, the free wheel unit locks the planetary gear unit such that the sun wheel rotates with the same r.p.m. as the belt pulley. In this known gear unit, the components are arranged in substantially three planes side by side. The belt pulley is provided in a first plane, the planetary gear unit is arranged in a second plane, and the electro-magnetic clutch is arranged in a third plane. This construction requires much space, particulary in axial direction. Therefore, it is difficult to accommodate such a gear unit in combination with a respective generator within the motor space of a modern vehicle. The gear unit is not encapsulated. Noises are not damped. The possibility of an oil bath is mentioned, but there is no disclosure how to provide such an oil bath. The r.p.m. relationship for the direct drive on the one hand and the fast drive on the other hand is rather large and is not acceptable for some applications.

From German Patent Publication 29 51 742 a further gear unit for combination with an auxiliary power consuming unit is known. This gear unit again has a direct drive and a fast drive selectable by a centrifugal clutch. A disadvantage of this known construction is that the wheels of the planetary gear unit are always rotating even in the direct drive condition. As a result thereof, noises occur at high r.p.m. of the driving internal combustion engine. Moreover, the automatic change by a centrifugal clutch involves problems, particularly in city operation.

OBJECT OF THE INVENTION

It is a first object of the present invention to provide a gear unit which requires a minimum of space adjacent a respective auxiliary power consuming unit. A further object is to provide a gear unit which can be changed between different modes of operation by external control. A still further object is to provide a gear unit in which the components of the planetary gear are at rest, when the gear unit is driven with high r.p.m. from the respective combustion engine. A still further object of the invention is that at low r.p.m. of the driving combustion engine, an increased transmission ratio can be smoothly obtained. A still further object of the invention is that the gear unit is sealed with respect to the surrounding space and can be provided with a volume of lubricant. A still further object of the invention is to allow preassembling of substantially all components of the gear unit such that the preassembled unit can be combined with the respective auxiliary power consuming unit both in the plant of the manufacturers and in repair and replacement situations.

SUMMARY OF THE INVENTION

A gear unit is provided for combination with an auxiliary power consuming unit of a motor-vehicle. The auxiliary power unit has stator means and an auxiliary unit input shaft with an axis. The gear unit comprises in a substantially annular arrangement about the axis a gear unit input member, a gear unit output member, planetary gear means including a sun wheel, a ring wheel, a planetary wheel carrier and at least one planetary wheel on the planetary wheel carrier. The gear unit further comprises free wheel means, a gear change clutch controllable by external control means and a lubricant chamber containing a liquid lubricant for lubrication of engagement faces of components of said gear unit which are movable with respect to each other in operation. The gear unit output member is adapted for being connected for common rotation with the auxiliary unit input shaft in substantial alignment therewith along the axis. The above-mentioned components of the gear unit are arranged such as to require only a small space adjacent the auxiliary power consuming unit at least in axial direction when the gear unit is combined with the auxiliary power consuming unit.

It has been found that a most compact gear unit can be obtained if the gear unit input member is continuously in driving connection with the planetary wheel carrier, if the ring wheel is adapted for continuous driving connection with the gear unit output member, if the gear change clutch is adapted for selectively either preventing a rotation of the sun wheel with respect to the stator means or releasing the sun wheel for rotation about the axis with respect to the stator means. In such case the free wheel means permits rotation of the gear unit output member with respect to the gear unit input member in a predetermined sense of rotation in response to the gear change clutch preventing tile sun wheel from rotation with respect to the stator means. On the other hand the free wheel means transmits an input torque from the gear unit input member to the gear unit output member in the predetermined sense of rotation in response to the gear change clutch releasing the sun wheel for rotation about the axis with respect to the stator means.

This basic working principle is a prerequisite for having the components of the planetary gear and the respective bearing means at rest in the direct or 1:1 transmission. This means that at high r.p.m. of the combustion engine the planetary gear system is at a rest.

Starting from the above system the gear unit input member may be shaped as a gear unit input sleeve extending axially through the sun wheel and having a first end portion adjacent to the stator means and a second end portion remote from the stator means. The gear unit output member may extend axially through the gear unit input member and have a first end portion adjacent to the stator means and a second end portion remote from the stator means.

The gear unit output member may be adapted for being fastened to the auxiliary unit input shaft. The gear unit input member may be axially fixed and rotatably mounted on the gear unit output member about the axis.

The planet wheel carrier may be mounted for common rotation oil the gear unit input member adjacent the first end portion of the gear unit input member axially between the sun wheel and the stator means. The ring wheel may be fixable on the gear unit output member adjacent the first end portion thereof by a ring wheel support member located axially between the planet wheel carrier and the stator means. The second end portion of the gear unit input member may be provided with a drive means engagement face about the axis.

The drive means engagement face may be e.g. a belt pulley. By these design features a further reduction in axial length can be obtained.

Still further reduction in axial space can be obtained if the sun wheel has a first axial end portion adjacent the stator means and a second axial end portion remote from the stator means. In this case the second axial end portion of the sun wheel may be connected for common rotation with a sun wheel stop member. This sun wheel stop member may be rotatably mounted and axially fixed on a radially outer surface of the gear unit input member. This sun wheel stop member carries a first clutch portion of the gear change clutch, while a second portion of the gear change clutch may be fastened or adapted for being fastened to the stator means.

A most helpful design feature for obtaining further reduction in the axial length consists in that the sun wheel stop member has a radially outward extending flange member, said flange member carrying the first portion of the gear change clutch unit. This first portion of the gear change clutch may be frictionally engageable with the second portion of the gear change clutch. The first portion of the gear change clutch may be axially movable with respect to the flange member, such as to obtain engagement of the clutch portions without axial movement of the flange member.

The gear change clutch may be an electro-magnetically controlled clutch. Alternatively it is also possible to use fluid operated clutches. In any case the clutch should be controllable from a control unit remote from the gear unit such that clutch actuation can be made arbitrarily. In using such a control unit a necessary hysteresis can be provided by the control unit for avoiding multiple gear change at a predetermined r.p.m. of the gear unit input member. The second portion of the gear change clutch may comprise an electromagnetic coil unit and the first portion of the gear change clutch may comprise an armature.

The ring wheel support member may be adapted for being clamped between the first end portion of the gear unit output member and an axially directed abutment face provided on the auxiliary unit input shaft in axially fixed relation thereto. Releasable clamping means may be provided for axially urging the gear unit output member against the ring wheel support member and the ring wheel support member against the abutment face. Such the assembly of the gear unit is completed when the gear unit is combined with the auxiliary power consuming unit.

The ring wheel support member may be a first housing portion of a chamber housing confining the lubricant chamber and accommodating the planetary gear means. This first housing portion may be located adjacent a first axial end portion of the sun wheel nearer to the stator means. The chamber housing may be completed by a second housing portion more remote from the stator means and adjacent a second end portion of the sun wheel. Such a compact housing may be provided around the planetary gear means. The second housing portion may be located axially between the flange member and the second end portion of said sun wheel.

For sealing the lubricant chamber the second housing portion may be in rotatable sealing engagement with the sun wheel stop member and the sun wheel stop member may be in rotatable sealing engagement with the gear unit input member.

The free wheel means may be located radially between the gear unit input member and the gear unit output member substantially in radial alignment with the sun wheel. This is of high advantage for obtaining an axially short design because the free wheels are substantially in the same plane as the planetary gear means.

Alternatively, the free wheel means may be located radially between a radially outer circumferential face of the planetary wheel carrier and a radially inward circumferential face of the ring wheel support member on a side of the ring wheel support member remote from the stator means. This results also in a very compact design particularly when taking into consideration that the wheel support member may be adapted in shape to a convex end face of an electric power generator. More particularly, the free wheel means may be located radially outwards of planet wheel mounting bolts fastened to the planet wheel carrier.

The gear unit input member may be rotatably mounted on the gear unit output member by first roller means adjacent the first end portions of the gear unit input member and the gear unit output member and by second roller means adjacent the second end portion of the gear unit input member and the gear unit output member.

This results in a very stable construction in which the belt pulley adjacent the second end portion of the gear unit input member resists bending forces resulting from a belt tension. For obtaining utmost stability it is desirable to use a sleeve-shaped gear unit output member such that the input shaft of the auxiliary power consuming unit can be extended through at least part of the axial length of the gear unit output member.

In view of the aim of short axial construction it is desirable that the first roller means are substantially in radial alignment with the sun wheel.

At least one of the first and second roller means may be adapted for axially positioning the gear unit input member and the gear unit output member with respect to each other in axial direction. For example the at least one roller means may be the first roller means and these first roller means can be ball bearing means.

Further the sun wheel stop member may be rotatably mounted on the gear unit input member by roller means. These roller means mounting the sun wheel stop member on the gear unit input member may be ball bearing means adapted for axially positioning the sun wheel stop member with respect to the gear unit input member.

For sealing the lubricant chamber the sun wheel stop member may be sealingly engaged with the gear unit input member at a location more remote from the stator means than the ball bearing means mounting the sun wheel stop member on the gear unit input member. Such these ball bearing means are also accessible to the lubricant.

The gear unit input member may be rotatably mounted on the gear unit output member by at least one roller bearing means comprising a group of roller members circularly arranged about the axis. These roller members may be in direct rolling engagement with respective rolling tracks of the gear unit input member and the gear unit output member. Further the sun wheel stop member may be rotatably mounted on the gear unit input member by at least one roller bearing means comprising a group of roller members circularly arranged about the axis. Also this group of roller members may be in direct rolling engagement with respective roller tracks of the gear unit input member and the sun wheel stop member.

By using the above-mentioned special form of roller bearings the radial and axial dimensions can be further reduced as compared with using complete conventional roller bearings with inner and outer ring members. Incidentally, the term roller member should be understood to include both, ball members and cylindrical roller members.

The sun wheel, said at least one planetary wheel and the ring wheel may be accommodated within a lubricant chamber, which is confined by a chamber housing and sealed by rotatable sealing means. This chamber housing has radially outer housing wall means. The gear change clutch may be at least partially located radially outwards the radially outer housing wall means and in axially overlapping relationship therewith. Such the axial length can be further reduced. The electro-magnetic clutch can be arranged substantially in the same plane as the planetary gear means.

The lubricant chamber is preferably formed as an annular chamber about the axis and accommodates at least one of the planetary gear means and the free wheel means. This annular chamber is rotatable about the axis in response to rotation of the gear unit input member. Such the liquid lubricant in the lubricant chamber forms a lubricant ring adjacent the radially outer wall means of the lubricant chamber in response to centrifugal forces. Lubricant conveying means may be located within the lubricant chamber for conveying lubricant from the lubricant ring towards engagement faces of respective components of the gear unit which are movable with respect to each other.

The lubricant conveying means may comprise a lubricant pick-up tube having a radially outer end entering into the lubricant ring and having pick-up means directed in substantially circumferential direction about the axis. This pick-up tube is rotated with respect to the lubricant chamber, such as to pick-up lubricant by the effect of pitot pressure conveying the lubricant to the places where it is needed.

The relative rotation of the lubricant ring and the pick-up tube may be obtained in that the lubricant chamber is confined by a chamber housing mounted for common rotation with the ring wheel while the pick-up tube is connected for common rotation with the sun wheel.

According to a preferred embodiment the pick-up tube is mounted for common rotation with the planetary wheel carrier and is at least partially located in a space layer orthogonal with respect to the axis and containing said at least one planetary wheel. Such a further reduction in axial length may be obtained.

According to a further embodiment the conveying means comprise at least one conveyer disc mounted for common rotation with the planetary wheel. This conveyer disc immerges with a respective radially outer circumferential portion into the lubricant ring and is directed with a respective radially inner circumferential portion towards a lubricant droplet receiving location. Thus, the respective radially outer circumferential portion is wetted by the lubricant when immerging into the lubricant ring and throws droplets towards the droplet receiving location when arriving at a position adjacent the droplet receiving location during rotation of the planetary wheel. This droplet receiving location may be in connection with the locations needing lubricant.

For example the droplet receiving location may be provided with droplet impingement face means, the droplet impingement face means scattering the droplets towards engagement locations of relatively movable components of the gear unit.

The gear unit may be preassembled for combination with the auxiliary power consuming unit. This preassembled gear unit may comprise a shaft engagement member shaped for fastening engagement with a fastening portion of the auxiliary unit input shaft. The preassembled gear unit is maintained in the preassembled condition after combination with the auxiliary power consuming unit by engagement of the shaft engagement member with the fastening portion of the auxiliary unit input shaft. Before making this combination, the preassembled gear unit may be securable in the preassembled condition by a preassembly securing member shaped substantially in accordance with the fastening portion of the auxiliary unit input shaft. This preassembly securing member is engaged with the shaft engagement member after assembly of the gear unit for maintaining the preassembled gear unit in the preassembled status during storage and transport.

A portion of said gear change clutch may be fastened to the stator means by an encapsulation sleeve encapsulating at least part of the gear unit. This is possible because the belt pulley is provided remote from the auxiliary power consuming unit.

The encapsulation sleeve may be releasably fastenable to the stator means. In fastening the encapsulation sleeve with respect to the stator means the axial play between the first and second portions of the gear change clutch may be adjusted.

The gear unit should provide a first transmission ratio of 1:1 and a second transmission ratio of less than 1,70:1 between the gear unit output member and the gear unit input member, with the gear unit output member having the higher r.p.m. This is desirable for obtaining a smooth transition between the different modes of operation.

The gear change clutch may be controlled by a control unit in response to the r.p.m. of the gear unit input member corresponding to the r.p.m. of an internal combustion engine driving the gear unit input member such that the r.p.m. of the gear unit output member is increased with respect to the r.p.m. of the gear unit input member when the rpm of the gear unit input member is reduced below a predetermined r.p.m. value.

It is, however, not always necessary to change the transmission ratio when the predetermined r.p.m. value is reached. If the auxiliary power consuming unit is for example an electric power generator feeding an electric accumulator, the increased transmission ratio is only necessary if the accumulator is in a poor condition. It is therefore possible that the increase of the r.p.m. of the gear unit output member beyond the r.p.m. of the gear unit input member in response to decrease of the gear unit input member below the predetermined r.p.m. value is additionally responsive to a signal representing a need for r.p.m. increase of said auxiliary power consuming unit.

It is most desirable said all movable components of the gear unit are at rest with respect to the gear unit output member when the gear unit output member is directly driven from the gear unit input member through the free wheel means. In such case there exists no need for lubrication and no lubricant flow must be maintained.

The free wheel means should be at least partially immerged into the lubricant ring. The free wheel means may for example be of the clamp roller type.

If the first housing portion and the second housing portion are connected to each other, the ring wheel may be fixed axially between the first and the second housing portion.

The lubricant conveying means as defined above may have lubricant discharge means in a position opposite to at least one substantially radially directed bore of a rotating hollow component which is rotating about the axis with respect to the lubricant discharge means. This lubricant discharge means may be an inner end of a pick-up tube or a conveyer disc. The discharged lubricant must occasionally be conveyed through a radial bore of a hollow component for example through a radial bore of the sleeve-shaped gear unit input member in order to provide the roller bearings between the gear unit member and the gear unit output member with lubricant. On the other hand a lubricant flowing through such a radial bore in radially inward direction is subject to centrifugal forces. In order to make sure that a radially inward flow occurs in spite of such centrifugal forces it is proposed that the radial bore has an elongate cross-section area along the axis.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which.

DETAILED DESCRIPTION OF PREFERRED EMBODIMENTS

Figure 1:
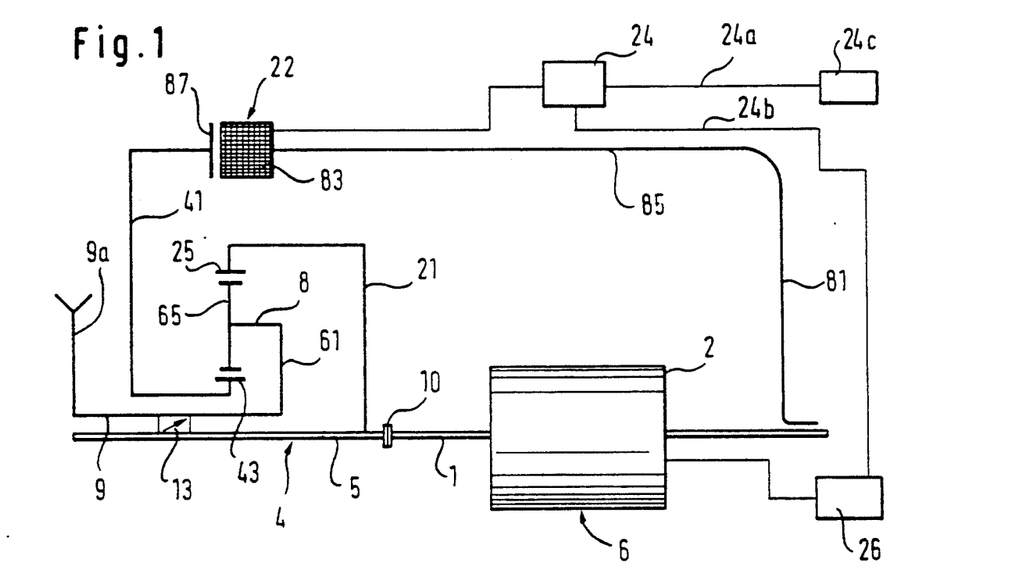
FIG. 1 shows a schematic view of a gear unit according to this invention.

In FIG. 1, an electric power generator 6 comprises a stator housing 81 in which a rotor 2 is rotatably mounted. The rotor is fastened on an input shaft 1 of the generator 6. A gear unit 4 is combined with the generator 6. The gear unit 4 comprises a gear unit input member 9 on which a belt pulley 9a is mounted for common rotation. The input member 9 is connected for common rotation with a planet carrier 61. The planet carrier 61 carries a bolt 8 on which a planet wheel 65 is rotatably mounted. The planet wheel 65 is meshing with a ring wheel 25 and a sun wheel 43. The ring wheel 25 is connected for common rotation with a gear unit output member 5. The gear unit output member 5 is connected with the input shaft 1 of the generator by coupling means 10. A free wheel unit 13 is provided between the gear unit input member 9 and the gear unit output member 5. The sun wheel 43 is connected with a sun wheel stop member 41. The sun wheel stop member 41 carries a first portion 87 of an electromagnetic gear change clutch 22. A second portion 83 of the electro-magnetic clutch 22 is fastened through an encapsulating sleeve 85 to the stator housing 81. The clutch portion 83 comprises an electro-magnetic coil which is fed by electric current from an external control unit 24. The clutch portion 87 comprises an armature which can be brought in frictional engagement with the clutch portion 83 by energizing the electro-magnetic coil. The control unit 24 has a first input 24a and a second input 24b. The belt pulley 9a is connected by a belt (not shown) with an output shaft of an internal combustion engine.

At a low r.p.m. of the internal combustion engine, the control unit 24 receives through input 24a a signal from a sensor 24c indicating that the r.p.m. of the internal combustion engine and as a result thereof also the r.p.m. of the input member 9 is below a predetermined value. In response to this signal the clutch 83 is closed such that the sun wheel 43 is stationary with respect to the stator housing 81. Under these circumstances, the output member 5 is driven with an increased r.p.m. as compared with the r.p.m. of the input member 9. A relative rotation between the input member 9 and the output member 5 is permitted by the free wheel 13. Such, the input shaft of the generator 6 is driven with a relatively high r.p.m. in spite of the low r.p.m. of the internal combustion engine. This may be particularly necessary, when an accumulator 26 fed by the generator 6 is in a poor condition. If the accumulator 26 is in good condition, it may not be necessary to increase the r.p.m. of the generator through the gear unit. Therefore, the input line 24b of the control unit 24 is connected with the accumulator 26 for detecting the condition of the accumulator. Only when both inputs 24a and 24b of the control unit 24 provide a signal to the control unit 24, the clutch 22 is energized and the sun wheel 43 is prevented from rotation.

As soon as the r.p.m. of the internal combustion engine is increased above the predetermined r.p.m. value a deenergizing signal is fed from the r.p.m. sensor 24c to the control unit 24. As a result thereof the clutch 22 is deenergized. Thus, the sun wheel 43 becomes freely rotatable. Under this condition, the free wheel 13 becomes effective and transmits the rotation of the input member 9 directly to the output member 5 and to the input shaft 1 of the generator. Thus, the r.p.m. of the generator are maintained low in spite of the increasing r.p.m. of the internal combustion engine.

In FIG. 2, one can see again the stator housing 81 of the generator and the input shaft 1 thereof. The input shaft 1 is rotatably mounted in a roller bearing 28 provided adjacent an end wall 30 of the stator housing. The inner ring member 28a of this ball bearing is shrunk on the input shaft 1. The left-hand end of the input shaft 1 is provided with external thread means 32. The sleeve-shaped output member 5 surrounds the input shaft 1 and abuts the ring wheel support member 21. The ring wheel support member 21 abuts a spacer ring 34 which abuts the inner ring member 28a which is fastened on the input shaft 1. A tensioning member 3 with a spanner face 3a engages by a terminal flange 36 the left-hand end of the output member 5. This tensioning member 3 is provided with internal thread means 36 and screwed onto the external thread means 32 of the input shaft 1. Thus, the output member 5, the ring wheel support member 21 and the spacer ring 34 are axially clamped between the terminal flange 3b and the ring member 28a. In this way, the output member 5 is connected for common rotation with the input shaft 1, and the ring wheel support member 21 is connected for common rotation with the output member 5 and the input shaft 1.

Figure 2:
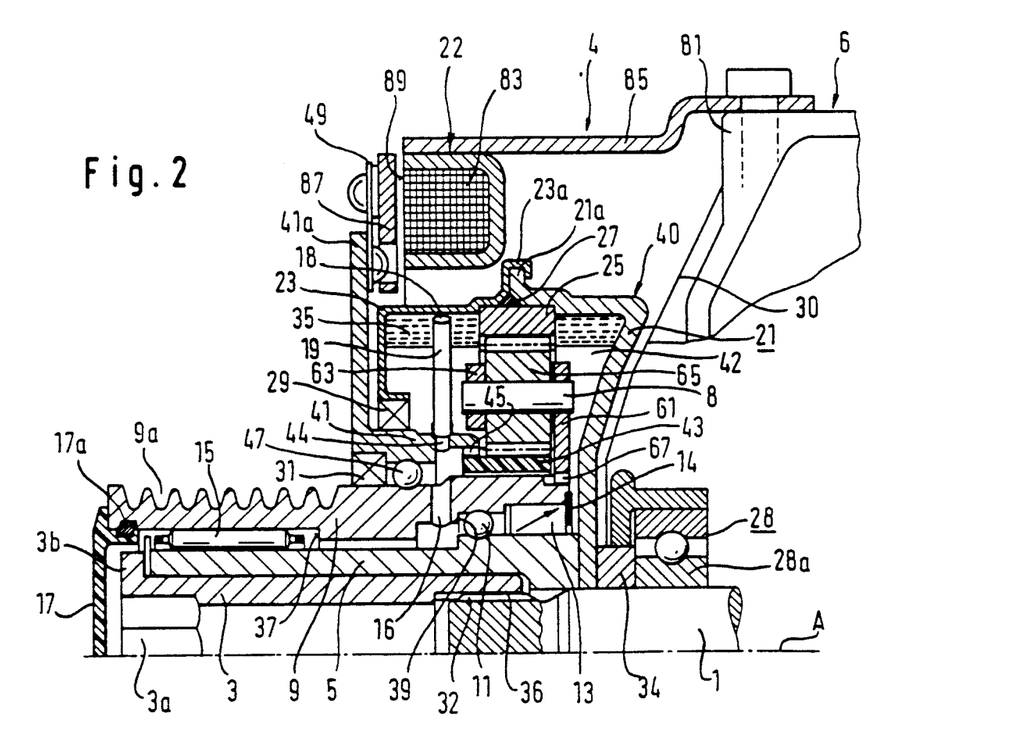
FIG. 2 shows a longitudinal section containing the axis of a gear unit according to this invention.

The sleeve-shaped input member 9 is rotatably mounted on the output member 5 by a ball bearing 11 and a needle bearing 15. The balls of the ball bearing 11 are in direct rolling engagement with roller tracks of the output member 5 and the input member 9. The same is true for the needles of the needle bearing 15. The left-hand end of the input member 9 is closed by a cover member 17. The left-hand end portion 9a of the input member 9 is shaped as a belt pulley.

The planet carrier 61 is fixed for common rotation on the input member 9 by teeth means 67. The planet carrier 61 carries the planet wheels 65 through the bolts which are stabilized by a further portion 63 of the planet carrier 61. The ring wheel 25 is fastened for common rotation with the ring wheel support member 21 in that a housing portion 23 is curled at 23a around a flange 21a of the ring wheel support member 21. The ring wheel support member 21 is shaped as a further housing portion such that the ring wheel carrier 21 and the housing portion 23 form an annular chamber housing 40. The sun wheel 43 is flyingly carried by the planet wheels 65 around the input member 9. The sun wheel 43 is angularly fixed with respect to the sun wheel stop member 41 through teeth means 45. The sun wheel stop member 41 is rotatably mounted on the input member 9 through a ball bearing 47 the balls of which are in direct rolling engagement with ball tracks of the input member 9 and the sun wheel stop member 41. The sun wheel stop member 41 is provided with a radially outwards extending flange 41a. This flange carries through axially deflectable spring means 49 the clutch portion 87 provided with the armature and engageable with a friction face 89 of the clutch portion 83 comprising the electromagnetic coil. The free wheel 13 is located radially between the output member 5 and the input member 9. The clutch portion 83 is fixed to an encapsulating sleeve 85 which is fastened to the stator housing 81 and axially adjustable with respect thereto for adjusting the gap between the clutch portions 87 and 83. Within the chamber housing 40 there is defined an annular lubricant chamber 42. This annular lubricant chamber is sealed by a sealing ring 29 between the housing portion 23 and the sun wheel stop member 41 and further by a rotatable sealing ring 31 provided between the sun wheel stop member 41 and the input member 9. Moreover, this chamber is sealed by a sealing ring 27 between the housing portions 21 and 23. Further, the lubricant chamber 42 is sealed by tight engagement of the housing portion 21 (ring wheel support member 21) with the output member 5 and by the cover 17 including a sealing ring 17a.

A volume of liquid lubricant 35 is contained within the lubricant chamber 42. The liquid lubricant forms a lubricant ring 35 in operation as a result of centrifugal forces. This lubricant ring rotates together with the chamber housing 40, i.e. with the output member 5. The sealing means 29 and 31 are radially inwards of the lubricant ring 35 so that they are not charged by the pressure of the lubricant resulting from centrifugal forces. A lubricant pick-up tube 19 is fixed to the sun wheel stop member 41 and has a radially outer end with an opening 18 directed in circumferential direction about the axis A. When the sun wheel stop member 41 is prevented from rotation by energization of the clutch 22, the lubricant ring 35 rotates with respect to the non-rotating pick-up tube 19 such that a pitot pressure is built up within the pick-up tube 19. The pressurized lubricant flows through the pick-up tube 19 in radially inwards direction and through a radial bore 44 of the sun wheel stop member 41 towards the ball bearing 47. Further, the pressurized lubricant impinges on the input member 9. The input member 9 is provided with radial bores 16. Accordingly, a beam of lubricant is periodically sent through the radial bore 16 into the radial gap between the input member 9 and the output member 5. The lubricant within this radial gap can flow towards the ball bearing 11, the needle bearing 15 and the free wheel 13. The lubricant collected in the area of the needle bearing 15 is prevented from back flow under centrifugal forces by a sill 37. The lubricant arriving at the free wheel 13 is prevented from the back flow under centrifugal forces by a disc 14 and a sill 39. Thus, sufficient lubrication of all bearing means and of the free wheel is assured. Moreover, the radially inner teeth of the ring wheel 25 are immerged in the lubricant ring 35 so that the engagement faces of the planet wheels 65 and the ring wheel 25 are also provided with lubricant.

The bores 16 have an elongated cross-sectional area in circumferential direction. By this configuration, the back flow of lubricant resulting from centrifugal forces through the bore 16 is reduced such that in balance a radially inward directed flow of lubricant occurs through the bore 16.

If the clutch 22 is released, the output member 5 and the input member 9 rotate as a unit. In this situation, no relative movement occurs between the ring wheel 25 and the sun wheel 43, no relative movement takes place between sun wheel stop member 41 and the input member 9 and no relative movement takes place between the input member 9 and the output member 5. No pitot pressure is built up in the pick-up tube 19. This is, however, not necessary, because no lubrication is required.

Before combining the gear unit 4 with the generator 6 the preassembled gear unit 4 is maintained in the preassembled status as shown in FIG. 2 by a securing bolt entered into the output member 5 from the left side in FIG. 2 and threaded into the internal thread means 36 of the tension member 3. This securing bolt has a head portion engaging the ring wheel support member 21 and pressing it against the output member 5.

It is to be noted that the clutch 22 and the planetary gear are very near to each other in axial direction. It is further to be noted that the ball bearing 11 and the free wheel 13 are substantially in the same plane as the planetary gear. The direct engagement of the ball and needle bearings with the adjacent parts further reduces the axial and radial dimensions. The gear unit is combinable with a generator of classic design in which the input shaft 1 has been provided with a simple belt pulley. Thanks to the above discussed design, the axial length of the combined generator and gear unit is not substantially longer than a corresponding classic generator with the belt pulley directly mounted on the input shaft 1.

The sealing rings 31 and 29 may be shaped as so-called sealing lips.

In operation with a high r.p.m. at a 1:1 transmission ratio, the lubricant is substantially contained within the annular chamber 42 so that escape of liquid is prevented.

Figure 3:
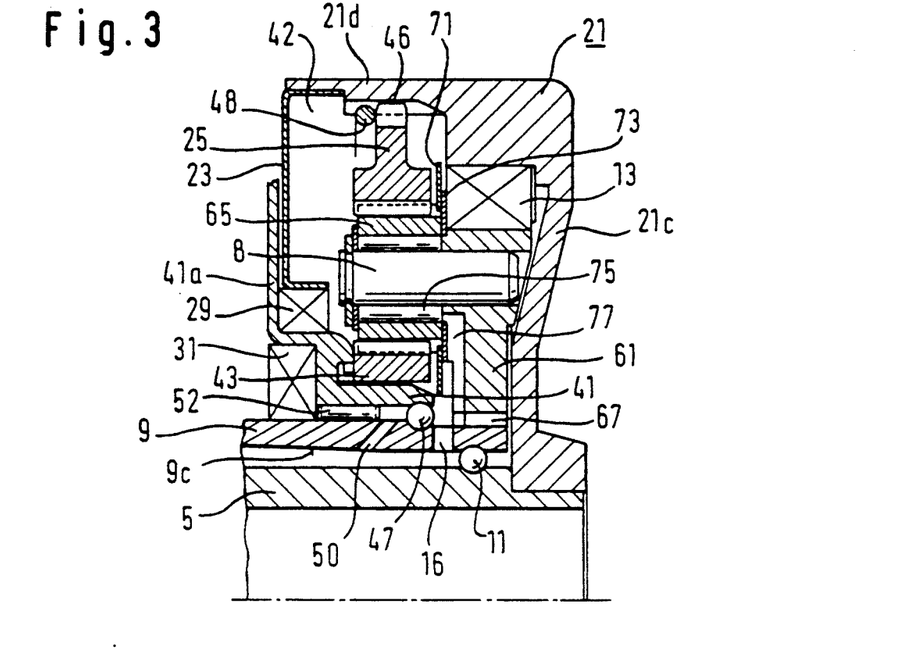
FIG. 3 shows a partial section according to FIG. 2 with a modified embodiment and FIG. 4 shows a partial section according to FIG. 2 with a further modified embodiment.

In the embodiment of FIG. 3, the ring wheel support member 21 is connected with the ring wheel 25 by teeth means 46 and axially secured by a securing ring 48. The free wheel 13 is located inside the lubricant chamber 42 such that the free wheel 13 at least partially immerges in the lubricant ring (not shown). In this embodiment, the ring wheel support member 21 is shaped such as to follow the convex form of the end wall 30 of the generator as shown in FIG. 2. The free wheel 13 can, therefore, be located in a transition zone between a flange portion 21c and a ring wheel carrier portion 21d of the ring wheel support member 21, and no valuable axial space is consumed for the location of the free wheel 13. The planet wheel 65 is combined with a conveyer disc 71. This conveyer disc 71 is rotating with the planet wheel 65 and is mounted by inner teeth on the outer teeth of the planet wheel 65. The radially outer circumferential portion of the conveyer disc 71 immerges in the lubricant ring (not shown), so that the conveyer disc 71 is wetted with lubricant. This lubricant is thrown away from the conveyer disc 71 by centrifugal forces. Droplets are thrown through the axially elongated radial bore 16. These droplets are scattered at the external circumferential face of the output member 5 and are directed towards the ball bearing 11 and the needle bearing 15 (shown only in FIG. 2). The conical face 9c of the input member 9 takes care of building up lubricant volume in the region of the needle bearing 15. If a certain volume of lubricant is collected adjacent the conical face 9c, lubricant can flow through a substantially radial bore 50 radially outwards towards the ball bearing 47 and towards a needle bearing 52 additionally provided between the input member 9 and the sun wheel stop member 41. It is further to be noted that the sun wheel 43 is in this embodiment radially and circumferentially fastened to the sun wheel stop member 41.

Back flow of lubricant can occur through a radial groove 77 provided within the planet carrier 61 and covered by a cover plate 73 fixed to the planet carrier 61. This back flow of lubricant lubricates a needle bearing 75 by which needle bearing 75 the planet wheel 65 is mounted on the bolt 8. The high velocity of planet wheels 65 provides a reliable lubrication of all bearings. One can again see that the ball bearings 11 and 47 are axially close together such that minimum axial dimension is obtained. The immerging of the free wheel 13 in the lubricant ring is helpful for avoiding noises and provides an effective lubrication of the free wheel.

Figure 4:
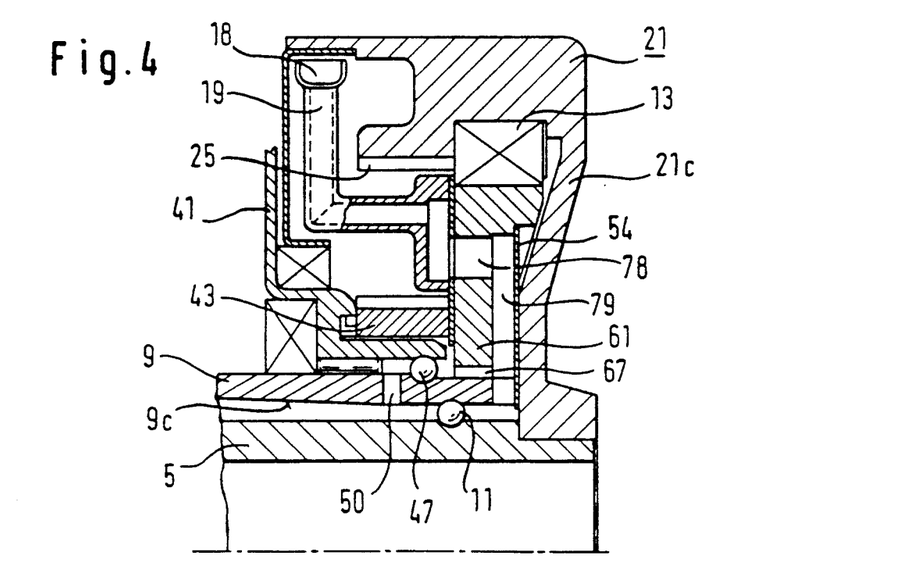

In the embodiment of FIG. 4, there is again used a pick-up tube 19 with a pick-up scoop 18 directed in substantially circumferential direction so as to pick-up lubricant by a pitot effect. The pick-up tube is in contradiction to the embodiment of FIG. 2 fixed to the planet carrier 61 between adjacent planet wheels. Thus, at least a part of the pick-up tube 19 can be housed in the same plane as the planet wheels. The lubricant flows through the pick-up tube 19 radially inwards and through the bore 78 of the planet carrier 61 into a radial groove 79 which is covered by a disc 54 rotating with the planet carrier 61. The lubricant flowing radially inwards through the groove 79 arrives at the ball bearing 11 and flows also along the conical face 9c to the needle bearing (shown only in FIG. 2). If a predetermined amount of lubricant has been collected in the zone of the needle bearing, a back flow occurs through the radial bore 50. Thus the ball bearing 47 is also lubricated. The back-flowing lubricant further wets the sun wheel 43 and the radially inner portions of the planetary wheels. The roller bearings 47 and 52 are located substantially in the same plane as the planetary gear means 25, 43, 61, 65. The gear change clutch 22 (not shown) is preferably also located in this common plane radially outwards of the ring wheel carrier portion 21d.

The clutch 22 is preferably annular about the axis A. This clutch can be replaced by mechanic, pneumatic or hydraulic clutches. The gear unit can be filled with oil before being combined with the generator. The encapsulating sleeve 85 and the clutch portion 83 are separate from the remaining part of the gear unit and can be supplied together with the remaining part.

The term gear unit output member 5 is to be understood in a broad sense of a member rotating with an output r.p.m. As the free wheel 13 may according to FIG. 3 be engaged with the ring wheel support member 21, the gear unit output member 5 is not necessarily directly included in the torque transmission between the ring wheel support member 21 and the input shaft 1.

The term sealing ring 31, 29 is to be understood also in a broad sense and comprises all kinds of sealing means permitting relative rotation of the respective parts which are to be sealed with respect to each other.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A gear unit for combination with an auxiliary power consuming unit of a motor-vehicle, said auxiliary power consuming unit having stator means and an auxiliary unit input shaft with an axis (A), comprising:

a gear unit input member;

a gear unit output member;

planetary gear means, including a sun wheel, a ring wheel, a planetary wheel carrier and at least one planetary wheel on said planetary wheel carrier;

said gear unit input member, said gear unit output member and said planetary gear means being located in a substantially annular arrangement about said axis (A);

gear change clutch means for selectively preventing or permitting rotation of said sun wheel with respect to said stator means;

external means for controlling said gear change clutch means;

free wheel means for permitting rotation of said gear unit output member with respect to said gear unit input member in a predetermined sense of rotation when said gear change clutch means prevents rotation of said sun wheel and for transmitting input torque from said gear unit input member to said gear unit output member in said predetermined sense of rotation when said gear change clutch means permits rotation of said sun wheel;

said gear unit input member being continuously in driving connection with said planetary wheel carrier;

said ring wheel being adapted for continuous driving connection with said gear unit output member;

said sun wheel having a central passage;

said gear unit input member being shaped as a gear unit input sleeve extending axially through said central passage of said sun wheel and having a first end portion adjacent to said stator means and a second end portion remote from said stator means;

said gear unit output member extending axially within said gear unit input member and having a first end portion adjacent to said stator means and a second end portion remote from said stator means;

said gear unit output member being adapted for being fastened to said auxiliary unit input shaft;

said gear unit input member being axially fixed and rotatably mounted on said gear unit output member about said axis (A);

said planetary wheel carrier being mounted for common rotation with said gear unit input member adjacent said first end portion of said gear unit input member axially between said sun wheel and said stator means;

securing means for drivingly securing said ring wheel with respect to said gear unit output member adjacent said first end portion thereof, said securing means including a ring wheel support member located axially between said planetary wheel carrier and said stator means; and said second end portion of said gear unit input member being provided with a drive means engagement face about said axis (A).

2. A gear unit as set forth in claim 1:

said sun wheel having a first axial end portion adjacent said stator means and a second axial end portion remote from said stator means;

said sun wheel being connected for common rotation with a sun wheel stop member located adjacent said second axial end portion;

said sun wheel stop member being rotatably mounted on a radially outer surface of said gear unit input member; and said sun wheel stop member carrying a first clutch portion of said gear change clutch means, a second portion of said gear change clutch means being carried by said stator means.

3. A gear unit as set forth in claim 2, said sun wheel stop member having a radially outward extending flange member, said flange member carrying said first portion of said gear change clutch means, said first portion of said gear clutch means being frictionally engageable with said second portion of said gear change clutch means.

4. A gear unit as set forth in claim 3, said first portion of said gear change clutch means being axially movable with respect to said flange member.

5. A gear unit as set forth in claim 4, said second portion of said gear change clutch comprising an electro-magnetic coil unit and said first portion of said gear change clutch comprising 6. A gear unit as set forth in claim 2, said ring wheel support member being a first housing portion of a chamber housing confining said lubricant chamber and accommodating said planetary gear means said first housing portion being located adjacent a first axial end portion of said sun wheel nearer to said stator means, said chamber housing being completed by a second housing portion more remote from said stator means and adjacent a second end portion of said sun wheel.

7. A gear unit as set forth in claim 6, said second housing portion being located axially between a flange member of said sun wheel stop member and said second end portion of said sun wheel.

8. A gear unit as set forth in claim 7, said second housing portion being in rotatable sealing engagement with said sun wheel stop member.

9. A gear unit as set forth in claim 8, said sun wheel stop member being in rotatable sealing engagement with said gear unit input member.

10. A gear unit as set forth in claim 2, said sun wheel stop member being rotatably mounted on said gear unit input member by roller means.

11. A gear unit as set forth in claim 10, said roller means mounting said sun wheel stop member on said gear unit input member being ball bearing means adapted for axially positioning said sun wheel stop member with respect to said gear unit input member.

12. A gear unit as set forth in claim 11, said sun wheel stop member being sealingly engaged with said gear unit input member at a location more remote from said stator means than said ball bearing means mounting said sun wheel stop member on said gear unit input member.

13. A gear unit as set forth in claim 2, said free wheel means being located radially between a radially outer circumferential face of said planetary wheel carrier and a radially inward circumferential face of said ring wheel support member on a side of said ring wheel support member remote from said stator means.

14. A gear unit as set forth in claim 13, said free wheel means being located radially outwards of planetary wheel mounting bolts fastened to said planetary wheel carrier.

15. A gear unit as set forth in claim 13, said stator means having a convex side wall adjacent said gear unit, said ring wheel support member having a flange portion substantially following said convex side wall, said flange portion being provided at the radially outer end thereof with a substantially axially extending ring wheel support portion, said ring wheel support portion and said flange portion defining a transition zone axially between said ring wheel and said flange portion and radially adjacent said ring wheel support portion, said free wheel being loaded in said transition zone.

16. A gear unit as set forth in claim 2, said sun wheel stop member being rotatably mounted on said gear unit input member by at least one roller bearing means, said roller bearing means comprising a group of roller members circularly arranged about said axis (A), said group of roller members being in direct rolling engagement with respective roller tracks of said gear unit input member and said sun wheel stop member.

17. A gear unit as set forth in claim 6, said first housing portion and said second housing portion being connected to each other, said ring wheel being fixed axially between said first and said second housing portion.

18. A gear unit as set forth in claim 1, said ring wheel support member being adapted for being clamped between said first end portion of said gear unit output member and an axially directed abutment face provided on said auxiliary unit input shaft in axially fixed relation thereto, releasable clamping means being provided for axially urging said gear unit output member against said ring wheel support member and said ring wheel support member against said abutment face.

19. A gear unit for driving an auxiliary power consuming unit of a motor vehicle, comprising:
  a gear unit input member;
  a gear unit output member;
  planetary gear means, including a sun wheel, a ring wheel, a planetary wheel carrier and at least one planetary wheel on said planetary wheel carrier;
  said gear unit input member, said gear unit output member and said planetary gear means being located in a substantially annular arrangement about said axis (A);
  gear change clutch means and free wheel means for selectively providing torque transmission between said gear unit input member and said gear unit output member through said planetary gear means or a transmission ratio between said gear unit input member and said gear unit output member different from that through said planetary gear means;
  external means for controlling said gear change clutch means;
  a lubricant chamber containing a liquid lubricant for lubrication of said gear unit;
  said lubricant chamber being an annular chamber about said axis (A) accommodating at least one of said planetary gear means and said free wheel means and being rotatable about said axis (A) in response to rotation of said gear unit input member;
  said liquid lubricant in said lubricant chamber forming a lubricant ring adjacent radially outer wall means of said lubricant chamber in response to centrifugal forces, and
  lubricant conveying means being located within said lubricant chamber for conveying lubricant from said lubricant ring towards locations of said gear unit which require lubrication.

20. A gear unit as set forth in claim 19, said lubricant conveying means comprising a lubricant pick-up tube having a radially outer end entering into said lubricant ring and having pick-up means directed in substantially circumferential direction about said axis (A), said pick-up tube being rotatable with respect to said lubricant chamber.

21. A gear unit as set forth in claim 20, said chamber housing being mounted for common rotation with said ring wheel, said pick-up tube being connected for common rotation with said sun wheel.

22. A gear unit as set forth in claim 20, said chamber housing being mounted for common rotation with said ring wheel, said pick-up tube being mounted for common rotation with said planetary wheel carrier, said pick-up tube being at least partially located in a space layer orthogonal with respect to said axis (A) and containing said at least one planetary wheel.

23. A gear unit as set forth in claim 19, said conveying means comprising at least one conveyer disc mounted for common rotation with said at least one planetary wheel, said conveyer disc immerging with a respective radially outer circumferential portion into said lubricant ring and being directed with a respective radially inner circumferential portion towards a lubricant droplet receiving location, said respective radially outer circumferential portion being wetted by said lubricant when immerging into said lubricant ring and throwing droplets towards said droplet receiving location when arriving at a position adjacent said droplet receiving location during rotation of the planetary wheel.

24. A gear unit as set forth in claim 23, said droplet receiving location being provided with droplet impingement face means for scattering said droplets towards engagement locations of relatively movable components of said gear unit.

25. A gear unit as set forth in claim 19, said lubricant conveying means comprising lubricant discharge means in a position opposite to at least one substantially radially directed bore of a rotating hollow component, said hollow component being rotating about said axis (A) with respect to said lubricant discharge means, said at least one radially directed bore having an elongate crossection area about said axis (A).

26. A gear unit as set forth in claim 19, said free wheel means being at least partially immerged into said lubricant ring.

27. A gear unit as set forth in claim 19, said ring wheel having radially inner teeth means for engagement with said at least one planetary wheel, said teeth means being at least partially immerged into said lubricant ring.

28. A gear unit for driving an auxiliary power consuming unit of a motor vehicle, comprising:
  a gear unit input member;
  a gear unit output member;
  planetary gear means, including a sun wheel, a ring wheel, a planetary wheel carrier and at least one planetary wheel on said planetary wheel carrier;
  said gear unit input member, said gear unit output member and said planetary gear means being located in a substantially annular arrangement about said axis (A);
  gear change clutch means and free wheel means for selectively providing torque transmission between said gear unit input member and said gear unit output member through said planetary gear means or a transmission ratio between said gear unit input member and said gear unit output member different from that through said planetary gear means;
  external means for controlling said gear change clutch means;
  a lubricant chamber containing a liquid lubricant for lubrication of said gear unit;
  said sun wheel, said at least one planetary wheel and said ring wheel being accommodated within said lubricant chamber, said lubricant chamber being confined by a chamber housing and being sealed by rotatable sealing means; and said chamber housing having radially outer housing wall means, said gear change clutch means being at least partially located radially outwards of said radially outer housing wall means and in axially overlapping relationship therewith.

29. A gear unit as claimed in claim 28, said gear change unit clutch means being located substantially in a common plane with said planetary gear means.

30. A gear unit as claimed in claim 29, said free wheel being substantially located in a common plane with said gear change clutch means and said planetary gear means.

31. A gear unit as claimed in claim 28, said lubricant chamber accommodating at least one of said free wheel means and bearing means of said gear unit.

32. A gear unit as claimed in claim 28, said gear change clutch means including an annular electromagnetic coil and an annular axially movable armature, said gear change clutch means being actuable upon axial movement of said armature in response to energization of said annular electromagnetic coil.

33. A gear unit for driving an auxiliary power consuming unit of a motor vehicle, comprising:
  a gear unit input member;
  a gear unit output member;
  planetary gear means, including a sun wheel, a ring wheel, a planetary wheel carrier and at least one planetary wheel on said planetary wheel carrier;
  said gear unit input member, said gear unit output member and said planetary gear means being located in a substantially annular arrangement about said axis (A);
  gear change clutch means and free wheel means for selectively providing torque transmission between said gear unit input member and said gear unit output member through said planetary gear means or a transmission ratio between said gear unit input member and said gear unit output member different from that through said planetary gear means;
  external means for controlling said gear change clutch means;
  a substantially annular lubricant chamber containing a liquid lubricant for lubrication of said gear unit;
  said sun wheel, said at least one planetary wheel and said ring wheel being accommodated within said lubricant chamber;
  said lubricant chamber being confined by a substantially annular chamber housing and being sealed by rotatable sealing means;
  said substantially annular chamber housing having radially outer housing wall means and being rotatable about said axis (A) in response to rotation of said gear unit input member;
  said liquid lubricant in said lubricant chamber forming a lubricant ring adjacent said radially outer wall means of said lubricant chamber in response to centrifugal forces; and
  said lubricant chamber containing a volume of lubricant independent of external lubricant supply during operation of said gear unit.

34. A gear unit for combination with an auxiliary power consuming unit of a motor-vehicle, said auxiliary power consuming unit having stator means and an auxiliary unit input shaft with an axis (A), comprising:
  a gear unit input member;
  a gear unit output member;
  planetary gear means, including a sun wheel, a ring wheel, a planetary wheel carrier and at least one planetary wheel on said planetary wheel carrier;
  said gear unit input member, said gear unit output member and said planetary gear means being located in a substantially annular arrangement about said axis (A);
  gear change clutch means and free wheel means for selectively providing torque transmission between said gear unit input member and said gear unit output member through said planetary gear means or a transmission ratio between said gear unit input member and said gear unit output member different from that through said planetary gear means;
  external means for controlling said gear change clutch means;
  a lubricant chamber containing a liquid lubricant for lubrication of said gear unit;
  means for connecting said gear unit output member for common rotation with said auxiliary unit input shaft in substantial alignment therewith along said axis (A);
  said gear unit input member and said gear unit output member being arranged in a coaxial relationship about said axis (A) and being at least partially coextensive along said axis (A);
  one of said gear unit input member and said gear unit output member being a central member and the other one of said gear unit input member and said gear unit output member being an external member;
  being means provided radially between said gear unit input member and said gear unit output member;
  said planetary gear means and said gear change clutch means being arranged annularly around said external member; and
  said gear unit input member and said gear unit output member having respective first end portions adjacent said auxiliary power consuming unit and respective second end portions more remote from said auxiliary power consuming unit, said second end portion of said gear unit input member being provided with a drive means engagement face.

35. A gear unit as set forth in claim 34, 1, 28, 19 or 33, said gear change clutch means comprising an electromagnetically controlled clutch.

36. A gear unit as set forth in claim 34, said free wheel means being located radially between said gear unit input member and said gear unit output member substantially in radial alignment with said sun wheel.

37. A gear unit as set forth in claim 34, said gear unit input member being rotatably mounted on said gear unit output member by at least one roller bearing means said roller bearing means comprising a group of roller members circularly arranged about said axis (A), said roller members being in direct rolling engagement with respective rolling tracks of said gear unit input member and said gear unit output member.

38. A gear unit as set forth in claim 34, said gear unit input member being rotatably mounted on said gear unit output member by first roller means adjacent said first end portions of said gear unit input member and said gear unit output member and by second roller means adjacent said second end portion of said gear unit input member and said gear unit output member.

39. A gear unit as set forth in claim 38, at least one of said first and second roller means being adapted for axially positioning said gear unit input member and said gear unit output member with respect to each other in axial direction.

40. A gear unit as set forth in claim 39, said at least one roller means being said first roller means, said first roller means being ball bearing means.

41. A gear unit as set forth in claim 34, 1, 28, 19 or 33; said auxiliary power consuming unit being an electric power generator.

42. A gear unit as set forth in claim 34, 1, 28, 19 or 33; said gear unit input member comprising a belt pulley.

43. A gear unit as set forth in claim 34, 1, 28, 19 or 33: said gear change clutch means being controlled by a control unit in response to the r.p.m. of the gear unit input member corresponding to the r.p.m. of an internal combustion engine driving said gear unit input member such that the r.p.m. of said gear unit output member is increased with respect to the r.p.m. of the gear unit input member when the r.p.m. of the gear unit input member is reduced below a predetermined r.p.m. value.

44. A gear unit as set forth in claim 43, said increase of the r.p.m. of said gear unit output member beyond said r.p.m. of said gear unit input member in response to decrease of said gear unit input member below said predetermined r.p.m. value being additionally responsive to a signal representing a need for r.p.m. increase of said auxiliary power consuming unit.

45. A gear unit as set forth in claim 34, 1, 28, 19 or 33, all movable components of said gear unit being at rest with respect to said gear unit output member when said gear unit output member is directly driven from said gear unit input member through said free wheel means.

46. A gear unit as set forth in claim 34, 1, 28, 19 or 33:
said gear unit being preassembled for combination with said auxiliary power consuming unit;
said preassembled gear unit comprising a shaft engagement member shaped for fastening engagement with a fastening portion of an auxiliary unit input shaft;
said preassembled gear unit being adapted for being maintained in the preassembled condition after combining with said auxiliary power consuming unit by engagement of said shaft engagement member with said fastening portion of said auxiliary unit input shaft;
said preassembled gear unit being securable in the preassembled condition before combination with said auxiliary power consuming unit by a preassembly securing member shaped substantially in accordance with said fastening portion of said auxiliary unit input shaft; and
said preassembly securing member being engageable with said shaft engagement member.

47. A gear unit as set forth in claim 34, 1, 28, 19 or 33;
a portion of said gear change clutch means being fastened or adapted for being fastened to stator means of said auxiliary power consuming unit by connecting means.

48. A gear unit as set forth in claim 47, said connecting means being releasably fastenable to said stator means.

49. A gear unit as claimed in claim 34, 28, 19 or 33 wherein:
said gear change clutch means selectively prevents or permits rotation of said sun wheel with respect to said stator means; and
said free wheel means permits rotation of said gear unit output member with respect to said gear unit input member in a predetermined sense of rotation when said gear change clutch means prevents rotation of said sun wheel and transmits input torque from said gear unit input member to said gear unit output member in said predetermined sense of rotation when said gear change clutch means permits rotation of said sun wheel.

50. A gear unit as claimed in claim 34, 1, 28, 19 or 33, said lubricant chamber containing a volume of lubricant independent of external lubricant supply during operation of said gear unit.

51. A gear unit as set forth in claim 34, 1, 28, 19 or 33;
said gear unit providing a first transmission ratio of 1:1 and a second transmission ratio of less than 1,70:1 between said gear unit output member and said gear unit input member, with the gear unit output member having the higher r.p.m., respectively.

* * * * *

UNITED STATES PATENT AND TRADEMARK OFFICE
CERTIFICATE OF CORRECTION

PATENT NO. : 5,330,393
DATED : July 19, 1994
INVENTOR(S) : Reihard Deppert et al.

It is certified that error appears in the above-indentified patent and that said Letters Patent is hereby corrected as shown below:

Col. 14, line 18, "comprising" should read --comprising an armature.--
Col. 16, line 33, "being rotating" should read --rotating--;
Col. 18, line 32, "being means" should read --bearing means--;
Col. 18, line 53, "means said" should read --means, said--;
Col. 19, line 5, "being" should read --comprising--.

Signed and Sealed this

Fourteenth Day of February, 1995

Attest:

BRUCE LEHMAN

Attesting Officer

Commissioner of Patents and Trademarks